United States Patent [19]

Moore et al.

[11] 4,228,247

[45] Oct. 14, 1980

[54] STABILIZED POLYOXYALKYLENE POLYETHER POLYOL

[75] Inventors: Richard A. Moore, Trenton; Robert J. Hartman, Southgate; William W. Levis, Jr., Wyandotte; Ralph E. Bloom, South Rockwood, all of Mich.

[73] Assignee: BASF Wyandotte Corporation, Wyandotte, Mich.

[21] Appl. No.: 70,561

[22] Filed: Aug. 29, 1979

[51] Int. Cl.$^2$ .......................... C08K 5/34; C08K 5/52
[52] U.S. Cl. .............................. 521/107; 260/45.7 PH; 260/45.8 NT; 260/45.9 QB; 260/45.95 H; 521/114; 521/116; 521/117; 521/174; 521/128
[58] Field of Search .............. 260/45.7 PH, 45.8 NT; 521/114, 116, 117, 174, 128

[56] References Cited

U.S. PATENT DOCUMENTS

| | | | |
|---|---|---|---|
| 2,915,496 | 12/1959 | Swart et al. | 521/107 X |
| 3,034,996 | 5/1962 | Kaplan | 521/107 |
| 3,113,941 | 12/1963 | Johns et al. | 260/45.8 NT |
| 3,437,694 | 4/1969 | Austin | 521/174 X |
| 3,530,127 | 9/1970 | Biland et al. | 260/45.8 NT X |
| 4,007,230 | 2/1977 | Hinze | 521/117 X |
| 4,021,385 | 5/1977 | Austin et al. | 521/174 |
| 4,080,361 | 3/1978 | Wang et al. | 260/45.8 NT |
| 4,127,515 | 11/1978 | MacRae | 521/116 X |
| 4,162,353 | 7/1979 | Papa et al. | 521/107 |

Primary Examiner—Howard E. Schain
Attorney, Agent, or Firm—Norbert M. Lisicki

[57] ABSTRACT

Synergistic stabilizer combinations consisting of phenols such as 2,6,-di-t-butyl-4-methylphenol, amines such as 4,4'-bis(alpha,alpha- dimethylbenzyl)diphenylamine and p,p'-di-octyldiphenylamine, and phosphites such as phenyldidecylphosphite with 3,5-di-t-butyl-4-hydroxyhydrocinnamic acid triester of 1,3,5-tris(2-hydroxyethyl)-s-triazine-2,4,6-(1H,3H,5H-trione are employed as oxidative stabilizers for polyoxyalkylene polyether polyols and for the prevention of scorch in polyurethane foams prepared therefrom.

8 Claims, No Drawings

STABILIZED POLYOXYALKYLENE POLYETHER POLYOL

BACKGROUND OF THE INVENTION

1. Field of the Invention

The present invention relates to stabilized polyoxyalkylene polyether polyol compositions and to their use in the preparation of polyurethane foams. Particularly, the invention relates to certain stabilizer combinations which synergistically enhance the heat and oxidative stability of polyoxyalkylene polyether polyols and inhibit color and/or scorch development in polyurethane foams made therefrom. More particularly, the present invention relates to polyether polyols synergistically stabilized by incorporating therein certain hindered phenolic compositions with certain aromatic amines and optionally including aliphatic and/or aromatic phosphites.

2. Description of the Prior Art

The prior art teaches the use of various hindered phenolic compositions for the stabilization of polyoxyalkylene polyether polyols. U.S. Pat. No. 3,437,694 teaches the use of 2,6-di-t-butyl-4-methylphenol and 2,4-dimethyl-6-t-butylphenol as stabilizers. U.S. Pat. No. 4,007,230 teaches that synergistic antioxidant compositions consisting of certain hindered phenols such as 2,6-di-t-butyl-4-methylphenol and 4,4'-bis-(alpha,alpha-dimethyl-benzyl)diphenylamine are useful for stabilizing polyoxyalkylene polyether polyols against oxidative degradation and preventing scorch in the polyurethane foams prepared from such polyols. U.S. Pat. No. 4,021,385 claims the use of phenols such as 2,6-di-t-butyl-4-methylphenol with 4,4'-bis(alpha,alpha-dimethyl-benzyl)diphenylamine incorporated in polyoxyalkylene polyether polyols which are employed then for the preparation of polyurethane foams. There is no teaching in the prior art of the synergistic effect of employing the combination of hindered phenols of the instant invention.

SUMMARY OF THE INVENTION

It has been discovered that a combination of antioxidants resullts in a synergistic combination useful for enhancing the oxidative stability of polyoxyalkylene polyether polyols and inhibiting scorch development in polyurethane foams prepared therefrom. Specifically, the invention relates to a polyoxyalkylene polyether polyol containing an effective amount of an antioxidant composition containing antioxidants selected from the group consisting of 2,6-di-t-butyl-4-methylphenol; 4,4'-bis(alpha,alpha-dimethylbenzyl)di-phenylamine; p,p'-dioctyldiphenylamine; phenyldidecylphosphite, and mixtures thereof with 3,5-di-t-butyl-4-hydroxyhydrocinnamic acid triester of 1,3,5-tris(2-hydroxyethyl)-s-triazine-2,4,6-(1H,3H,5H)-trione and the polyurethane foams prepared therefrom.

DESCRIPTION OF THE PREFERRED EMBODIMENTS

The compositions in accordance with this invention are composed of polyoxyalkylene polyether polyols containing effective amounts of antioxidant compositions containing from about 20 to about 95 weight percent of an antioxidant selected from the group consisting of 2,6-di-t-butyl-4-methylphenol, 4,4'-bis(alpha, alpha-dimethylbenzyl)diphenylamine, p,p'-dioctyldiphenylamine, phenyldidecylphosphite, and mixtures thereof with from about 5 to about 80 weight percent of 3,5-di-t-butyl-4-hydroxyhydrocinnamic acid triester of 1,3,5-tris(2-hydroxyethyl)-s-triazine-2,4,6(1H,3H,5H)-trione. These polyoxyalkylene polyether polyols are subsequently employed in the preparation of polyurethane foams. The compositions contemplated in this invention may be employed in the polyoxyalkylene polyether polyol at concentrations from 0.10 part to 1.0 part per 100 parts of the polyoxyalkylene polyether polyol. Preferably, the concentration of the antioxidant composition is about 0.5 part per 100 parts of polyoxyalkylene polyether polyol.

Additionally, it has been discovered that a specific mixture of the 3,5-di-t-butyl-4-hydroxyhydrocinnamic acid triester of 1,3,5-tris(2-hydroxyethyl)-s-triazine-2,4,6-(1H,3H,5H)-trione and 2 parts of 2,6-di-t-butyl-4-methylphenol are advantageously employed since this specific mixture has a melting point of 38° C. vs. a melting point of about 127° C. and 69° C., respectively, for the two compounds. It has been discoverd that not only is this particular mixture effective in protecting the polyoxyalkylene polyether polyols from oxidative and thermal degradation, but this specific mixture is more easily dissolved in the polyoxyalkylene polyether polyols than if the trione compound alone is employed.

It is also contemplated that among the phosphites which may be employed in combination with the other stabilizers are the following: phenyldidecylphoshite, tris(nonylphenylphosphite), triphenylphosphite, triethylphosphite, phenylneopentylphosphite, tris(2-ethylhexyl)phosphite, tris(isooctyl)phosphite.

The polyoxyalkylene polyether polyols which can be stabilized with the stabilizer composition of the instant invention are those prepared by condensing monomeric units, such as ethylene oxide, propylene oxide, butylene oxide, and mixtures thereof, with active hydrogen compounds such as ethylene glycol, propylene glycol, water, dipropylene glycol, trimethylene glycol, 1,2-butanediol, 1,3-butanediol, 1,4-butanediol, 1,2,6-hexanetriol, glycerol, trimethylpropane, trimethylolethane, hydroquinone, pentaerythritol, alphamethylglucoside, sorbitol, sucrose, ethylenediamine, diethylenetriamine, toluenediamine, aniline, methylenedianiline, piperazine, triisopropanolamine, phosphoric acids and Bisphenol A, wherein those polyols have a molecular weight range from about 300 to about 26,000.

The preparation of polyurethane foams from the stabilized polyoxyalkylene polyether polyols of the present invention may be accomplished by any of the standard prior art procedures. This includes the prepolymer quasi-prepolymer, or one-shot methods. The stabilized polyoxyalkylene polyether polyols are reacted with an organic polyisocyanate in the presence of a catalyst, a surfactant and a blowing agent. Various other additives, such as inorganic fillers, may also be employed if desired.

The organic polyisocyanate which may be employed in the preparation of the polyurethane foams include diisocyanates, triisocyanates, and polyisocyanates. Those contemplated are toluene diisocyanate, a mixture of about 80 percent by weight of 2,4-toluene diisocyanate and 20 percent 2,6-toluene diisocyanate. Other isocyanates include 4,4'-methylenebis(phenylisocyanate); 3,3'-bitoluene-4,4'-diisocyanate; 3,3'-dimethoxybiphenylene-4,4'-diisocyanate, naphthylene-1,5-diisocyanate; hexamethylene diisocyanate; 1,4-phenylene diisocyanate; polyphenylene polymethylene polyisocyanate, etc.

The following examples illustrate the invention. All parts are by weight unless otherwise stated.

EXAMPLES 1-13

The polyoxyalkylene polyether polyol employed in these examples was a 3000 molecular weight polyoxyalkylene polyether polyol prepared by the condensation of a mixture of ethylene and propylene oxide with glycerol and containing 6 weight percent oxyethylene groups.

The stability test consists of heating at the indicated temperatures 150 grams of the polyoxyalkylene polyether polyol mixture in a 3-neck reaction flask equipped with a gas diffuser, tube, air, thermometer and dry ice condenser which also serves as an air outlet. Air at 40 liters per hour is bubbled through the mixture for 3 hours. Samples of the polyoxyalkylene polyether polyol mixture are then analyzed for APHA color and changes in peroxide development, pH, and acid number.

The APHA color test is conducted as disclosed in "Standard Methods for the Examination of Water and Sewage", 9th Edition, 1946, pages 14 and 15, American Public Health Association. Distilled water has an APHA color rating of 0-5. It is desirable that the stabilized polyoxyalkylene polyether polyols after heating do not have a color rating greater than 60.

The pH changes are determined by employing alcohol-water solutions of the polyols measured with a glass and calomel electrode system and a pH meter.

The acid numbers are determined by potentiometrically titrating a sample of the polyol in an isopropanol-water mixture with a solution of alcoholic KOH and is calculated as mg KOH per gram of sample.

The peroxide development test consists of adding 1 gram of ground KI crystals to 10 grams of polyol and heating in an oven at 100° C. for approximately 2 minutes. The degree of peroxide development may be judged by the intensity of color development due to the liberation of free iodine.

To be suitable as stabilizers for polyoxyalkylene polyether polyols the polyol compositions must not develop, at temperatures of at least 140° C., an color of greater than 60 units, a PH change greater than 1.0 units, an acid number change greater than 0.010, and no more than a slight peroxide color.

Table I illustrates the results obtained when various stabilizer combinations were employed. None of the stabilizers when tested alone gave satisfactory results.

EXAMPLES 1-13

TABLE I

| Example | Stabilizer Type | /Percent | Temp. °C. | APHA Color Start | APHA Color End | pH Start | pH End | Acid No. Start | Acid No. End | Peroxide Start | Peroxide End |
|---|---|---|---|---|---|---|---|---|---|---|---|
| 1 | A | 0.3 | 145 | 10 | 20 | 7.35 | 7.5 | .006 | .007 | None | None |
|   | B | 0.15 |  |  |  |  |  |  |  |  |  |
|   | C | 0.05 |  |  |  |  |  |  |  |  |  |
| 2 | D | 0.30 | 145 | 25 | 25 | 7.15 | 6.4 | .007 | .009 | None | None |
|   | B | 0.15 |  |  |  |  |  |  |  |  |  |
|   | C | 0.05 |  |  |  |  |  |  |  |  |  |
| 3 | A | 0.30 | 150 | 10 | 20 | 7.25 | 7.5 | .017 | .017 | None | None |
|   | B | 0.15 |  |  |  |  |  |  |  |  |  |
|   | C | 0.05 |  |  |  |  |  |  |  |  |  |
| 4 | D | 0.30 | 150 | 25 | 40 | 7.4 | 5.25 | .017 | .085 | None | sl |
|   | B | 0.15 |  |  |  |  |  |  |  |  |  |
|   | C | 0.05 |  |  |  |  |  |  |  |  |  |
| 5 | A | 0.30 | 155 | 10 | 30 | 7.0 | 6.6 | ND | .018 | None | None |
|   | B | 0.15 |  |  |  |  |  |  |  |  |  |
|   | C | 0.05 |  |  |  |  |  |  |  |  |  |
| 6 | D | 0.25 | 150 | 5 | 10 | 7.25 | 6.9 | .007 | .007 | None | None |
|   | B | 0.15 |  |  |  |  |  |  |  |  |  |
|   | C | 0.05 |  |  |  |  |  |  |  |  |  |
|   | A | 0.05 |  |  |  |  |  |  |  |  |  |
| 7 | A | 0.05 | 140 | 25 | 25 | 7.0 | 7.0 | .006 | .006 | None | None |
|   | B | 0.10 |  |  |  |  |  |  |  |  |  |
|   | C | 0.05 |  |  |  |  |  |  |  |  |  |
| 8 | A | 0.05 | 140 | 5 | 10 | 6.9 | 7.1 | .006 | .006 | None | None |
|   | E | 0.05 |  |  |  |  |  |  |  |  |  |
|   | C | 0.05 |  |  |  |  |  |  |  |  |  |
| 9 | A | 0.067 | 150 | 5 | 5 | 7.3 | 6.5 | .007 | .010 | None | None |
|   | B | 0.10 |  |  |  |  |  |  |  |  |  |
|   | C | 0.05 |  |  |  |  |  |  |  |  |  |
|   | D | 0.133 |  |  |  |  |  |  |  |  |  |
| 10 | A | 0.033 | 145 | 25 | 25 | 7.5 | 7.5 | .011 | .008 | None | None |
|   | B | 0.10 |  |  |  |  |  |  |  |  |  |
|   | C | 0.05 |  |  |  |  |  |  |  |  |  |
|   | D | 0.067 |  |  |  |  |  |  |  |  |  |
| 11 | A | 0.35 | 145 | 25 | 60 | 7.5 | 7.5 | .011 | .011 | sl | sl |
|   | B | 0.15 |  |  |  |  |  |  |  |  |  |
| 12 | A | 0.35 | 145 | 25 | 60 | 7.5 | 7.5 | .011 | .007 | sl | sl |
|   | E | 0.15 |  |  |  |  |  |  |  |  |  |
| 13 | A | 0.05 | 145 | 25 | 5 | 7.3 | 7.3 | .007 | .007 | None | None |
|   | C | 0.05 |  |  |  |  |  |  |  |  |  |
|   | D | 0.25 |  |  |  |  |  |  |  |  |  |

TABLE I-continued

| Example | Stabilizer Type/Percent | Temp. °C. | APHA Color Start | APHA Color End | pH Start | pH End | Acid No. Start | Acid No. End | Peroxide Start | Peroxide End |
|---|---|---|---|---|---|---|---|---|---|---|
| | E 0.15 | | | | | | | | | |

Stabilizer A - is 3,5-di-t-butyl-4-hydroxyhydrocinnamic acid triester of 1,3,5-tris(2-hydroxyethyl)-s-triazine-2,4,6(1H,3H,5H)-trione.
Stabilizer B - is 4,4'-bis(alpha,alpha-dimethylbenzyl)diphenylamine.
Stabilizer C - is phenyldidecylphosphite.
Stabilizer D - is 2,6,-di-t-butyl-4-methylphenol.
Stabilizer E - is p,p'-dioctyldiphenylamine.
sl - slight
ND - not determined The results in Table I show the surprising synergistic effect of Stabilizer A with the prior art stabilizers.

EXAMPLES 14-17

The polyoxyalkylene polyether polyols of Examples 3, 9, 10, and 12, were employed to prepare polyurethane foams by a one-shot process according to the recipe given below.

| Ingredients | Parts by Weight |
|---|---|
| Polyol | 100 |
| Water | 4.5 |
| Silicone surfactant | 1.0 |
| Catalyst A* | 0.125 |
| Catalyst B** | 0.25 |
| Toluene diisocyanate | 59.2 |

*Stannous octoate
**Triethylenediamine in propylene glycol

Immediately after the formation of the foam, 3 inch cubes were cut from the center of the polyurethane foams, placed into an air-circulating oven maintained at 185° C. and allowed to remain for two hours. The cubes were then removed and examined for color and evidence of scorching. In all cases the foams yellowed slightly but no scorching was detected.

The embodiments of the invention in which an exclusive privilege or property is claimed are as follows:

1. A polyoxyalkylene polyether polyol containing an effective amount of a stabilizer composition containing
   a. from about 20 to about 95 weight percent of a stabilizer selected from the group consisting of 2,6-di-t-butyl-4-methylphenol, 4,4'-bis(alpha,alpha-dimethylbenzyl)diphenylamine, p,p'-dioctyldiphenylamine, phenyldidecylphosphite, and mixtures therefrom, and
   b. from about 5 to about 80 weight percent of 3,5-di-t-butyl-4-hydroxyhydrocinnamic acid triester of 1,3,5-tris(2-hydroxyethyl)-s-triazine-2,4,6(1H,3H,5H)-trione.

2. The polyol of claim 1 wherein the ratio of 2,6-di-t-butyl-4-methylphenol to 3,5-di-t-butyl-4-hydroxyhydrocinnamic acid triester of 1,3,5-tris(2-hydroxyethyl)-s-triazine-2,4,6(1H,3H,5H)-trione is 2:1.

3. The polyol of claim 1 wherein the concentration of said stabilizer composition is from 0.10 part to 1.0 part per 100 parts of said polyol.

4. The polyol of claim 1 wherein the concentration of said stabilizer composition is 0.5 part per 100 parts of said polyol.

5. A polyurethane foam prepared by the reaction of an organic polyisocyanate with a polyoxyalkylene polyether polyol in the presence of a blowing agent, said polyol stabilized against oxidation with an effective amount of a stabilizer composition containing
   a. from about 20 to about 95 weight percent of a stabilizer selected from the group consisting of 2,6-di-b-butyl-4-methylphenol, 4,4'-bis-t-(alpha,alpha-dimethylbenzene)diphenylamine, p,p'-dioctyldiphenylamine, phenyldidecylphosphite, and mixtures thereof, and
   b. from about 5 to about 80 weight percent of 3,5-di-t-butyl-4-hydroxyhydrocinnamic acid triester of 1,3,5-tris(hydroxyethyl)-s-triazine-2,4,6(1H,3H,5H)-trione.

6. The foam of claim 5 wherein the ratio of 2,6-di-t-butyl-4-methylphenol to 3,5-di-t-butyl-4-hydroxyhydrocinnamic acid triester of 1,3,5-tris(2-hydroxyethyl)-s-triazine-2,4,6(1H,3H,5H)-trione is 2:1.

7. The foam of claim 5 wherein the concentration of said stabilizer composition in the polyol is from 0.10 part to 1.0 part per 100 parts of said polyol.

8. The foam of claim 5 wherein the concentration of said stabilizer composition in the polyol is 0.5 part per 100 parts of said polyol.

* * * * *